US010409897B2

(12) United States Patent
DeRose et al.

(10) Patent No.: US 10,409,897 B2
(45) Date of Patent: *Sep. 10, 2019

(54) INHERITANCE OF RULES ACROSS HIERARCHICAL LEVEL

(71) Applicant: Microsoft Technology Licensing, LLC, Redmond, WA (US)

(72) Inventors: Pedro Dantas DeRose, Snoqualmie, WA (US); Puneet Narula, Bothell, WA (US); Viktoriya Taranov, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,939

(22) Filed: Oct. 5, 2017

(65) Prior Publication Data

US 2018/0032486 A1    Feb. 1, 2018

Related U.S. Application Data

(63) Continuation of application No. 14/878,011, filed on Oct. 8, 2015, now Pat. No. 9,792,264, which is a (Continued)

(51) Int. Cl.
*G06F 7/00* (2006.01)
*G06F 17/00* (2019.01)
(Continued)

(52) U.S. Cl.
CPC ........ *G06F 17/2241* (2013.01); *G06F 16/958* (2019.01); *H04L 41/22* (2013.01)

(58) Field of Classification Search
CPC .. G06F 17/2241; G06F 17/274; G06F 16/958; G06F 16/24542; G06F 9/451; G06F 21/6209; H04L 41/22
See application file for complete search history.

(56) References Cited

U.S. PATENT DOCUMENTS 5,956,707 A  9/1999  Chu
6,122,664 A  9/2000  Boukobza et al.
(Continued)

FOREIGN PATENT DOCUMENTS

CN  1556482 A  12/2004
CN  1609859 A   4/2005
(Continued)

OTHER PUBLICATIONS

"Managing Firewall Services", Retrieved from http://www.cisco.com/en/US/docs/security/security_ management/cisco_security_manager/security_manager/3.1/user/gu ide/porules. html, Aug. 30, 2011, 80 Pages.
(Continued)

*Primary Examiner* — Azam M Cheema
(74) *Attorney, Agent, or Firm* — Merchant & Gould

(57) ABSTRACT

Rules, such as condition-action rules, are configured at different levels of a hierarchy. For example, a top level site administrator may configure rules, lower level administrators may configure rules and end users may configure rules. Rules created at a higher hierarchical level are automatically inherited by lower hierarchical levels in the same branch of the hierarchy. The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create a local copy of the rule that is editable. Rules may be ordered and when a lower hierarchical level inherits the rules, the ordering is preserved. The lower level may toggle on/off the execution of each rule within the ordering.

19 Claims, 4 Drawing Sheets

Related U.S. Application Data continuation of application No. 13/287,645, filed on Nov. 2, 2011, now Pat. No. 9,189,563.

(51) Int. Cl.
  *G06F 17/22* (2006.01)
  *G06F 16/958* (2019.01)
  *H04L 12/24* (2006.01)

(56) References Cited

U.S. PATENT DOCUMENTS

| | | | |
|---|---|---|---|
| 7,149,738 B2 | 12/2006 | Kumar et al. | |
| 7,162,473 B2 | 1/2007 | Dumais et al. | |
| 7,440,964 B2 | 10/2008 | Gosse et al. | |
| 7,591,010 B2 | 9/2009 | Shelest et al. | |
| 7,640,236 B1 | 12/2009 | Pogue | |
| 7,962,633 B1 | 6/2011 | Sidebottom et al. | |
| 8,041,713 B2 | 10/2011 | Lawrence | |
| 8,341,692 B1* | 12/2012 | Boyer | H04N 21/2541 726/1 |
| 9,189,563 B2* | 11/2015 | DeRose | G06F 17/3089 |
| 9,558,274 B2 | 1/2017 | Holm et al. | |
| 9,792,264 B2* | 10/2017 | DeRose | G06F 17/3089 |
| 2003/0051020 A1 | 3/2003 | Kadam et al. | |
| 2003/0078914 A1 | 4/2003 | Witbrock | |
| 2004/0215630 A1 | 10/2004 | Parekh et al. | |
| 2004/0243587 A1 | 12/2004 | Nuyens et al. | |
| 2005/0021504 A1 | 1/2005 | Atchison | |
| 2005/0091671 A1 | 4/2005 | Deem et al. | |
| 2005/0138018 A1 | 6/2005 | Sakai et al. | |
| 2005/0154744 A1 | 7/2005 | Morinville | |
| 2006/0036581 A1 | 2/2006 | Chakrabarti et al. | |
| 2006/0167858 A1 | 7/2006 | Dennis et al. | |
| 2006/0224607 A1 | 10/2006 | Tchaitchian et al. | |
| 2006/0236381 A1 | 10/2006 | Weeden | |
| 2006/0287980 A1 | 12/2006 | Liu et al. | |
| 2007/0219979 A1 | 9/2007 | Jung et al. | |
| 2007/0266002 A1 | 11/2007 | Chowdhury et al. | |
| 2007/0281986 A1 | 12/2007 | Collier et al. | |
| 2007/0282986 A1 | 12/2007 | Childress et al. | |
| 2007/0294225 A1 | 12/2007 | Radlinski et al. | |
| 2008/0154608 A1 | 6/2008 | Evermann et al. | |
| 2008/0209047 A1 | 8/2008 | Beigi et al. | |
| 2008/0288467 A1 | 11/2008 | Szeto et al. | |
| 2008/0301113 A1 | 12/2008 | Chi et al. | |
| 2009/0094216 A1 | 4/2009 | Hou et al. | |
| 2009/0094234 A1 | 4/2009 | Marvit et al. | |
| 2009/0100015 A1 | 4/2009 | Golan | |
| 2009/0171907 A1 | 7/2009 | Radovanovic | |
| 2009/0234799 A1 | 9/2009 | Betawadkar-norwood et al. | |
| 2009/0292700 A1 | 11/2009 | Castellani et al. | |
| 2009/0299992 A1 | 12/2009 | Klinger et al. | |
| 2009/0307205 A1 | 12/2009 | Churchill et al. | |
| 2009/0319385 A1 | 12/2009 | Jackson et al. | |
| 2009/0328129 A1* | 12/2009 | Desai | G06F 21/6209 726/1 |
| 2010/0005496 A1 | 1/2010 | Ellis et al. | |
| 2010/0085906 A1 | 4/2010 | Yamamoto | |
| 2010/0106724 A1 | 4/2010 | Anderson | |
| 2010/0106725 A1 | 4/2010 | Julian et al. | |
| 2010/0145944 A1 | 6/2010 | Punera et al. | |
| 2010/0185678 A1 | 7/2010 | Dettinger et al. | |
| 2010/0223546 A1 | 9/2010 | Liu | |
| 2010/0256969 A1 | 10/2010 | Li et al. | |
| 2010/0257193 A1 | 10/2010 | Krupka et al. | |
| 2011/0016104 A1 | 1/2011 | Leconte | |
| 2011/0137902 A1 | 6/2011 | Wable et al. | |
| 2011/0153671 A1 | 6/2011 | Taniguchi | |
| 2011/0208670 A1* | 8/2011 | Joseph | G06Q 40/04 705/36 R |
| 2011/0246499 A1 | 10/2011 | Carmel et al. | |
| 2011/0265189 A1 | 10/2011 | Liao et al. | |
| 2012/0072406 A1 | 3/2012 | Iwakura et al. | |
| 2012/0089641 A1 | 4/2012 | Wilde et al. | |
| 2013/0046787 A1 | 2/2013 | Ford et al. | |
| 2013/0110795 A1 | 5/2013 | Derose et al. | |
| 2013/0110813 A1 | 5/2013 | Holm et al. | |
| 2013/0110816 A1 | 5/2013 | Khan et al. | |
| 2013/0110860 A1 | 5/2013 | Taranov et al. | |
| 2016/0041953 A1 | 2/2016 | Derose et al. | |
| 2017/0132316 A1 | 5/2017 | Holm et al. | |

FOREIGN PATENT DOCUMENTS

| | | |
|---|---|---|
| CN | 101292236 A | 10/2008 |
| CN | 102043833 A | 5/2011 |
| CN | 102165447 A | 8/2011 |
| JP | 2009093648 A | 4/2009 |
| KR | 100714504 B1 | 4/2007 |
| WO | 2006071928 A2 | 7/2006 |

OTHER PUBLICATIONS

"Query Rewrite Optimization Guidelines", Retrieved from https://www-01.ibm.com/support/knowledgecenter/SSEPGG_9.7.0/com.ibm.db2.luw.admin.perf.doc/doc/c0024525.html, Sep. 5, 2011, 4 Pages.

"Set operations (SQL)", Retrieved from https://en.wikipedia.org/wiki/Set_operations_(SQL), Retrieved on Sep. 5, 2011, 4 Pages.

"Symantec Endpoint Protection 11.0", Retrieved from http://www.symantec.com/avcenter/security/ADC/Configuring_Application_Control_1.1.pdf, Retrieved on: Sep. 13, 2011, 25 Pages.

"Update Statement", Retrieved from http://publib.boulder.ibm.com/infocenter/db2luw/v8/index.jsp?topic=/com.ibm.db2.udb.doc/admin/r0001022.htm, Retrieved on Sep. 5, 2011, 9 Pages.

"What is Visitor Traffic & Analytic Rules and How is it Setup?", Retrieved from http://www.americommerce.com/kb/afmviewfaq.aspx?faqid=297, Retrieved on Sep. 5, 2011, 5 pages.

"Extended Search Report Issued in European Patent Application No. 12845302.4", dated Aug. 31, 2015, 8 Pages.

"Final Office Action issued in U.S. Appl. No. 13/287,645", dated May 22, 2014, 16 Pages.

"Non Final Office Action issued in U.S. Appl. No. 13/287,645", dated Mar. 16, 2015, 16 Pages.

"Non Final Office Action issued in U.S. Appl. No. 13/287,645", dated May 8, 2013, 13 Pages.

"Non Final Office Action issued in U.S. Appl. No. 13/287,645", dated Dec. 3, 2013, 20 Pages.

Shankar, et al., "Specification-enhanced Policies for Automated Management of Changes in IT Systems", In 20th Conference on Large Installation System Administration., Dec. 3, 2006, 16 Pages.

"Non-final Office Action Issued in U.S. Appl. No. 13/287,717", dated Sep. 30, 2013, 28 Pages.

"Final Office Action issued in U.S. Appl. No. 13/287,717", dated May 8, 2014, 17 Pages.

"Non Final Office Action issued in U.S. Appl. No. 13/287,717", dated Jan. 9, 2015, 19 Pages.

"Non Final Office Action issued in U.S. Appl. No. 13/287,717", dated Sep. 30, 2013, 13 Pages.

"Final Office Action issued in U.S. Appl. No. 13/287,997", dated Oct. 14, 2015, 16 Pages.

"Final Office Action Issued in U.S. Appl. No. 13/287,997", dated Jun. 17, 2014, 18 Pages.

"Non-Final Office Action issued in U.S. Appl. No. 13/287,997", dated Jan. 17, 2014, 11 Pages.

"Non Final Office Action Issued in U.S. Appl. No. 13/287,997", dated May 3, 2016, 19 Pages.

"Non Final Office Action issued in U.S. Appl. No. 13/287,997", dated May 4, 2015, 15 Pages.

"Final Office Action issued in U.S. Appl. No. 13/287,999", dated Jun. 17, 2014, 19 Pages.

"Non final Office Action issued in U.S. Appl. No. 13/287,999", dated Apr. 24, 2015, 25 Pages.

"Non-final Office Action Issued in U.S. Appl. No. 13/287,999", dated Feb. 6, 2014, 29 Pages.

"Final Office Action Issued in U.S. Appl. No. 15/417,790", dated Apr. 10, 2018, 21 Pages.

(56) References Cited

OTHER PUBLICATIONS

"Non Final Office Action in U.S. Appl. No. 15/417,790", dated Oct. 16, 2018, 20 Pages.
"First Office Action Issued in Chinese Patent Application No. 201210429730.4", dated Jan. 23, 2015, 15 Pages.
"Fourth Office Action Issued in Chinese Patent Application No. 201210429730.4", dated Nov. 22, 2016, 12 Pages.
"Second Office Action Issued in Chinese Patent Application No. 201210429730.4", dated Nov. 30, 2015, 11 Pages.
"Third Office Action Issued in Chinese Patent Application No. 201210429730.4", dated May 27, 2016, 19 Pages.
"Office Action Issued in Japanese Patent Application No. 2014-540103", dated Jun. 30, 2016, 12 Pages.
Anagnostopoulos, et al., "An Optimization Framework for Query Recommendation", In Proceedings of the third ACM international conference on Web search and data mining, Feb. 4, 2010, pp. 161-170.
Aronis, et al., "The WoRLD: Knowledge Discovery from Multiple Distributed Databases", In Proceedings of 10th International Florida AI Research Symposium, 1997, 5 pages.
Curran, Steve, "SharePoint 2010 Search Scopes Explained", Retrieved from http://sharepointfieldnotes.blogspot.in/2011/07/sharepoint-2010-search-scopes-explained.html, Jul. 23, 2011, 4 Pages.
Elmongui, et al., "A Framework for Testing Query Transformation Rules", In Proceedings of the 2009 ACM SIGMOD International Conference on Management of data, Jun. 29, 2009, pp. 257-268.
Ioannidis, Yannis E., "Query Optimization", In Journal of ACM Computing Surveys, vol. 28, Issue 1, Mar. 1, 1996, 38 Pages.
"Office Action Issued in Mexican Patent Application No. MX/a/2014/005402", dated Aug. 30, 2016, 2 Pages.
"International Search Report & Written Opinion Issued in PCT Application No. PCT/US12/63135", dated Mar. 28, 2013, 10 Pages.
"International Preliminary Report on Patentability Issued in PCT Application No. PCT/US2012/063134", dated May 15, 2014, 2 Pages.
"International Search Report and Written Opinion in PCT Application No. PCT/US2012/063134", dated Mar. 11, 2013, 10 Pages.
"Search Report Issued in PCT Application No. PCT/US2012/063134", dated Aug. 31, 2015, 8 Pages.
Pirahesh, et al., "A Rule Engine for Query Transformation in Starburst and IBM DB2 CS DBMS", In Proceedings of the Thirteenth International Conference on Data Engineering, Apr. 7, 1997, pp. 391-400.
Rittman, Mark, et al., "Advanced Development Techniques using OBIEE Plus", Retrieved from https://www.hitpages.com/doc/5926209464565760/15/, Retrieved on Sep. 5, 2011, 86 Pages.
Shankar, et al., "An ECA-P Policy-based Framework for Managing Ubiquitous Computing Environments", In proceedings of the Second Annual International Conference on Mobile and Ubiquitous Systems: Networking and Services, Jul. 17, 2005, 8 Pages.
"Office Action Issued in European Patent Application No. 12845302.4", dated Apr. 30, 2019, 9 Pages.

\* cited by examiner

INHERITANCE OF RULES ACROSS HIERARCHICAL LEVEL

CROSS-REFERENCE TO RELATED APPLICATIONS

This application is a continuation application and claims priority to U.S. patent application Ser. No. 14/878,011, filed Oct. 8, 2015, entitled "INHERITANCE OF RULES ACROSS HIERARCHICAL LEVELS,", issued U.S. Pat. No. 9,792,264, which is a continuation of U.S. patent application Ser. No. 13/287,645, filed Nov. 2, 2011, entitled "INHERITANCE OF RULES ACROSS HIERARCHICAL LEVELS," issued U.S. Pat. No. 9,189,563, which applications are incorporated herein by reference in their entirety.

BACKGROUND

Many services and programs use rules for configuring and defining the operation of the program. Some of the rules may be set by a system administrator, some rules may be set by a user of the system, while other rules may be set by other administrators at other levels within a hierarchy of the system. For example, a search service may have an administrator for the overall search service that sets rules and administrators for smaller portions of the search service (e.g. a site collection). Configuring and managing all of these different rules can be a complex task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Rules, such as condition-action rules, are configured at different levels of a hierarchy. For example, a top level site administrator may configure rules, lower level administrators may configure rules and end users may configure rules. Rules created at a higher hierarchical level are automatically inherited by lower hierarchical levels in the same branch of the hierarchy. The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create a local copy of the rule that is editable. Rules may be ordered and when a lower hierarchical level inherits the rules, the ordering is preserved. While the ordering of any rules remains constant when inherited at the lower levels, the lower level may toggle on/off the execution of each rule within the ordering.

DETAILED DESCRIPTION

Figure 1:
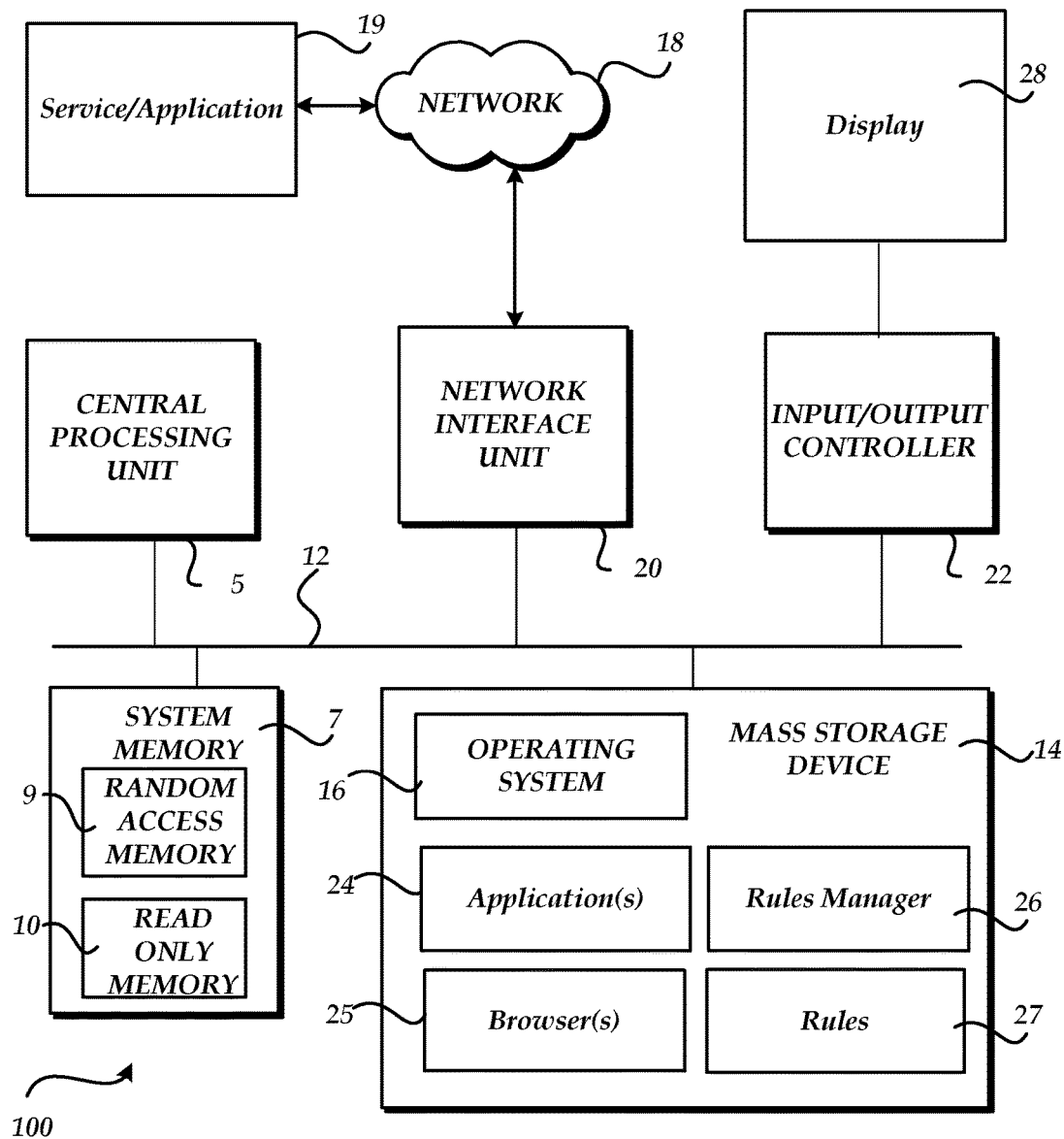
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser applications 25, rules 27, and rules manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as productivity applications, and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Rules manager 26 is configured to display and interact with rules at different hierarchical levels. Rules manager 26 may be a part of many different applications/services. For example, rules manager 26 may be a part of a cloud based multi-tenant service that provides resources (e.g. services, data . . . ) to different tenants. Rules manager 26 may be a part of other programs/services 19, such as, but not limited to: email, security (e.g. firewalls), search, and the like. According to an embodiment, rules manager 26 operates with MICROSOFT SHAREPOINT. Generally, rules, such as condition-action rules, are configured by different users/administrators at different levels of a hierarchy. For example, a top level site administrator may configure rules, lower level administrators may configure rules and an end user may configure rules. Rules created at a higher hierarchical level are automatically inherited by lower hierarchical levels in the same branch of the hierarchy (e.g. a sibling does not inherit a rule from a same hierarchical level). The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create an editable local copy of the rule. Rules may be ordered and when a lower hierarchical level inherits the rules, the ordering is preserved. The ordering of any hard-ordered rules remains constant at the lower levels, but the lower level may toggle on/off the execution of each rule within the ordering. Additional details regarding the operation of rules manager 26 will be provided below.

Figure 2:
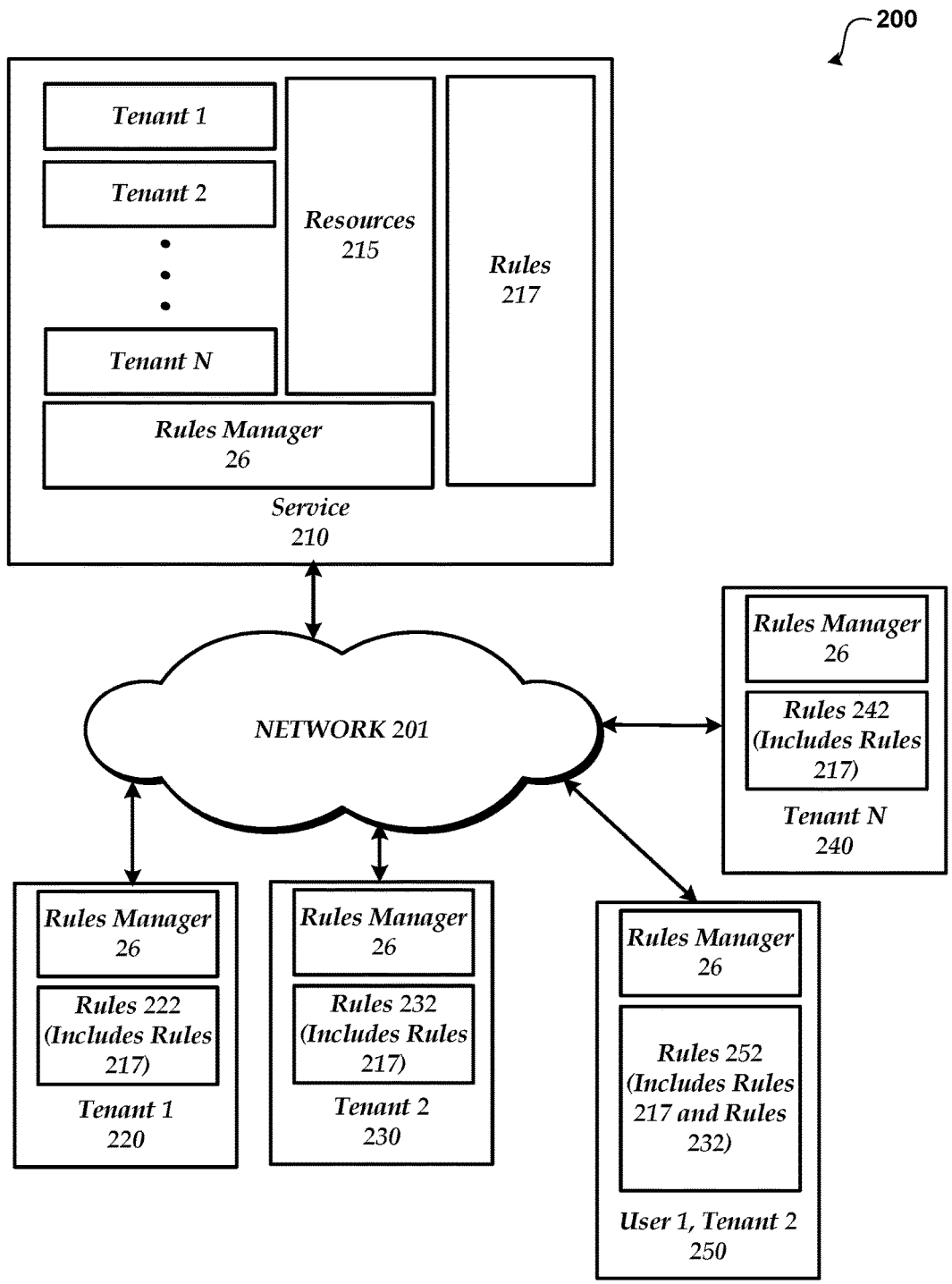
FIG. 2 illustrates an exemplary system for configuring rules at different hierarchical levels.

FIG. 2 illustrates an exemplary system for configuring rules at different hierarchical levels. As illustrated, system 200 includes service 210, tenant 1 (220), tenant 2 (230), tenant N (240), user 1 of tenant 2 (250) and network 201. Rules may be configured for other services/programs. The illustration of service 210 is for explanatory purposes and is not intended to be limiting.

As illustrated, service 210 is a multi-tenant service that provides resources 215 and services to any number of tenants (e.g. Tenants 1-N). According to an embodiment, multi-tenant service 210 is a cloud based service that provides resources/services to tenants subscribed to the service and maintains each tenant's data separately and protected from other tenant data. For example, service 210 may be configured to provide services corresponding to productivity applications (e.g. word processing, spreadsheet, presentation, messaging . . . ), security applications, data management applications, data sharing applications, and the like.

As illustrated, rules 217 are condition-action rules that are configured by one or more users/administrators at different hierarchical levels for the service. Rules 217 may store all/portion of the rules for one or more of the hierarchical levels. For example, rules 217 may store the rules for each of the different hierarchical levels. Rules may also/alternatively be stored at other locations. For example, the rules for each hierarchical level may be distributed across each the different hierarchical levels.

One or more rules manager 26 may be included within the system. For example, a single rules manager 26 may be utilized within service 210 and/or a rules manager may be included at other locations (e.g. each tenant and user as illustrated in 220, 230, 240 and 250). The distributed rules managers may be configured to interact with each other. For example, rules manager 26 on Tenant 1 may be configured to provide a local rules manager for tenant 1 that communicates rule information to the rules manager 26 of service 210. The following is an example flow of creating rules at different hierarchical levels for service 210.

In the current example, Tenants 1-N have one or more administrators/users at a lower hierarchical level from one or more administrators of service 210. Tenant 1 includes inherited rules 217 developed by an administrator of service 210 and local rules 222 that were created by Tenant 1. Tenant 2 includes inherited rules 217 developed by an administrator of service 210 and local rules 232 that were created by Tenant 2. Tenant N includes inherited rules 217 developed by an administrator of service 210 and local rules 232 that were created by Tenant N. User 1 of Tenant 2 (250) includes inherited rules 217 developed by an administrator of service 210, inherited rules 232 that were created by Tenant 2 (230) and local rules 252 that were created by user 1 of tenant 2.

Whenever a rule is created/changed at a higher level within the hierarchy, the rule is automatically incorporated within the lower hierarchical levels within the same branch of the hierarchy. The source of the inherited rule is indicated with its display such that the hierarchical level of creation can readily be determined. For example, the name of the rule may include the name of the administrator and/or level that created the rule (See FIG. 3). The inherited rule(s) may be toggled on/off at the lower hierarchical levels. According to an embodiment, inherited rules are non-editable. Instead, a copy of an inherited rule may be made to create an editable local copy of the rule. A rule may toggled on/off at any level within the hierarchy. Toggling on/off the rule at a higher level within the hierarchy is reflected in lower hierarchical levels. According to an embodiment, when a lower level has previously toggled off the rule, toggling the rule on/off at a higher level within the hierarchy is not propagated to the hierarchical level that already has the rule turned off.

Rules may be ordered and when a lower hierarchical level inherits the rules, the ordering is preserved. The ordering of any hard-ordered rules remains constant at the lower levels, but the lower level may toggle on/off the execution of each rule within the ordering.

Execution of the rules can be configured by the program/service to which they apply. According to an embodiment, rules from a higher level within the hierarchy are fired/executed before rules at lower levels within the hierarchy and hard-ordered rules are fired in the order specified. Different configuration of rule execution may be made depending on the service/program.

Figure 3:
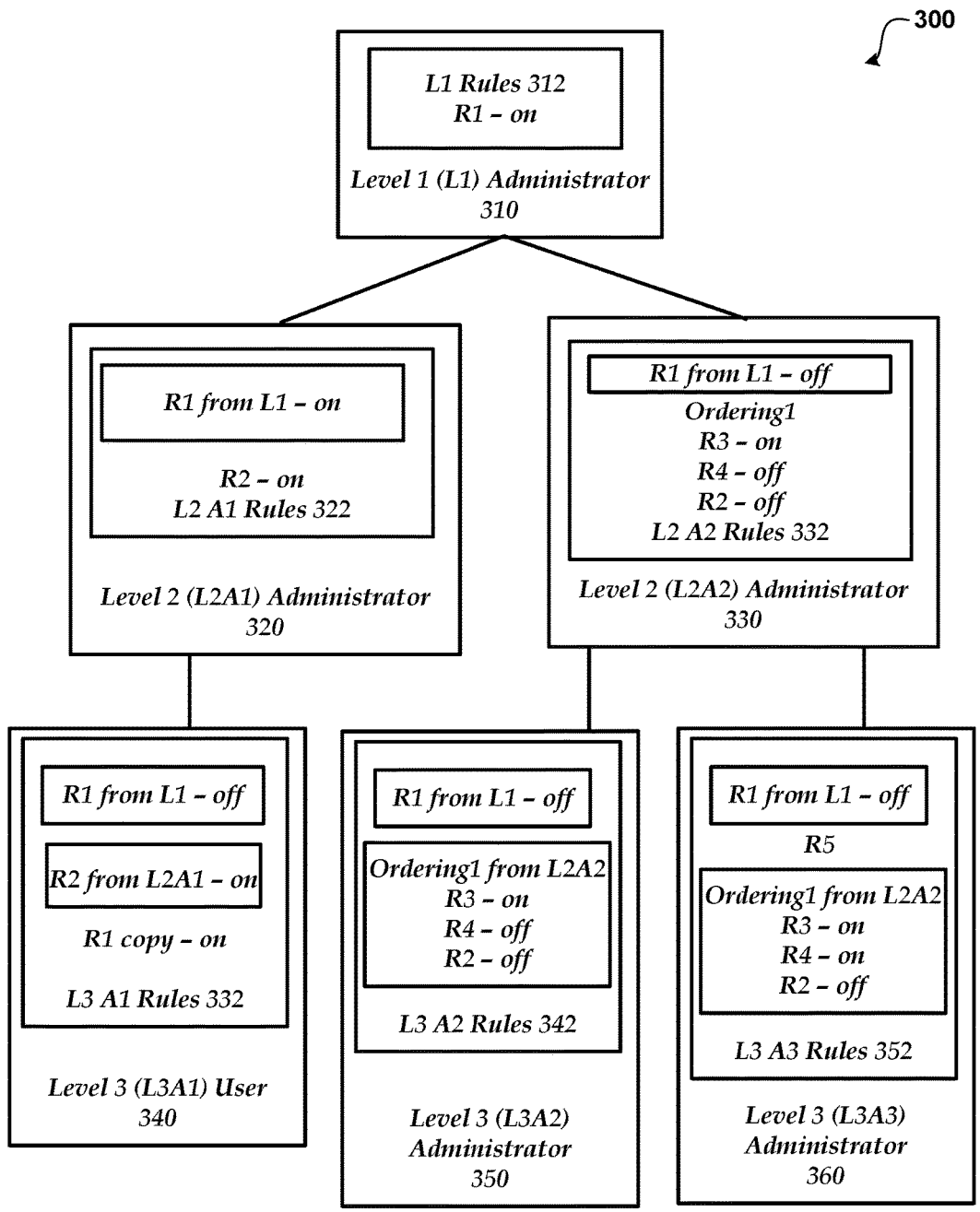
FIG. 3 shows a hierarchy of rules configured by different administrators/users within the hierarchy.

FIG. 3 shows a hierarchy of rules configured by different administrators/users within the hierarchy. As illustrated rules hierarchy 300 includes level 1 (L1) administrator 310, level 2 (L2A1) administrator 320, level 2 (L2A2) administrator 330, level 3 (L3A1) user 340, level 3 (L3A2) administrator 350 and level 3 (L3A3) administrator 360. More of fewer hierarchical levels may be included.

As illustrated, L1 at level 1 has configured one rule (R1) that is currently toggled on. Each hierarchical level below level 1 (level 2 and level 3) inherit rule R1. According to an embodiment, when a rule is inherited by a level, descriptive information is included that shows what level and/or who created the rule. For example, referring to box 322 it can be seen rule R1 came from level 1 (L1). Other naming schemes may be used. For example, rules from different levels may be shown in different colors/fonts, a rule may include a name of the creator, and the like. Rule R2 in box 322 is a rule created at level 2 by L2A1.

Inherited rules can be toggled on/off. In the current example, L2A2 (330) and L3A1 (340) has toggled rule R1 off. Toggling on/off a rule may occur at any time. When a user/administrator toggles on/off a rule at a higher level it is changed at the lower levels. In the current example, L2A2 toggling R1 off caused R1 at level 3 for L3A2 L3A3 to be toggled off. According to an embodiment, when a user at a lower level toggles off a rule and it is toggled at a higher level, the change to the rule is not automatically propagated.

Changes to a sibling's rules do not affect each other. For example, if L2A1 makes a change to a rule (e.g. creates a new rule, toggles a rule on/off, changes an ordering) that change is not propagated to its sibling L2A2. The changes are, however, automatically reflected in the children of L2A1 (in this example, L3A1).

According to an embodiment, inherited rules are not changeable. Instead, an inherited rule may be copied to create an editable local copy. For example, L3A1 (340) has created a copy of R1 that is editable.

Rules may be ordered such that a specific firing of the rules is created (hard ordering). In the current example, L2A2 has created an ordering of rules (Ordering1) that is inherited by the lower hierarchical levels within the same branch (L3A2 and L3A3). As with a single inherited rule, an ordering of rules is non-editable but the ordering may be copied and each rule within the ordering may be toggled on/off. For example, L3A3 has toggled rule R4 on.

Figure 4:
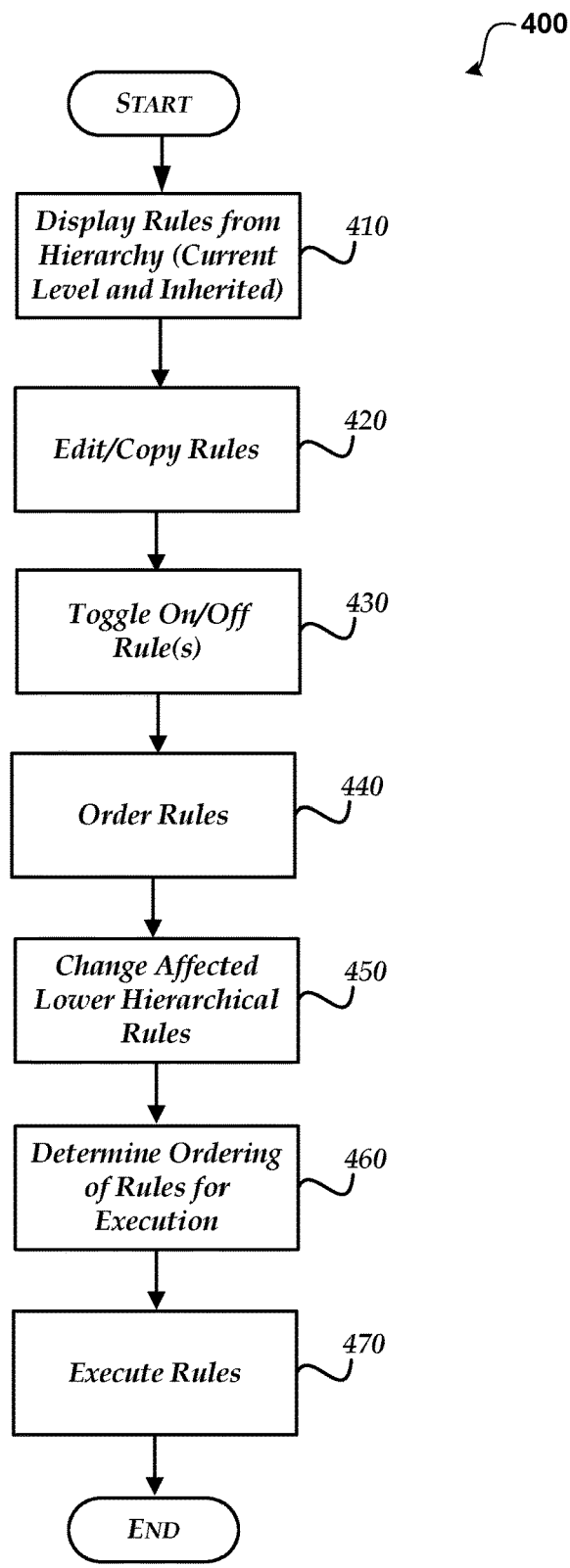
FIG. 4 shows an illustrative processes for configuring rules at different hierarchical levels.

FIG. 4 shows an illustrative processes for configuring rules at different hierarchical levels. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 400 flows to operation 410, where rules from the hierarchy are displayed. The rules include the rules created at the current hierarchical level along with inherited rules from higher levels within the hierarchy. According to an embodiment, when a change is made to a rule at a higher level within the hierarchy it is automatically reflected and updated in the display at the lower hierarchical level(s).

Moving to operation 420, an authorized user/administrator may edit/copy rules. As discussed above, inherited rules may be copied to create an editable local copy of the rule on that level. An authorized user may also create new rules at the hierarchical level. Rules created at the hierarchical level of the displayed rules may also be edited/changed. Copied rules and newly created/edited rules are automatically propagated to the lower levels.

Flowing to operation 430, any of the displayed rules may be toggled on/off. For example, a rule from one or more levels may be toggled on/off. As discussed above, toggling a rule at a higher level toggles the rule at the lower hierarchical levels unless the lower level has already explicitly toggled the rule to off.

Transitioning to operation 440, an ordering of the rules may be performed. A user may order rules that were not inherited as ordered. According to an embodiment, an inherited set of ordered rules is not changeable at a lower level. Instead, a user at the lower level would create a copy of the ordered rules and reconfigure the ordering of the local copy. The user may then toggle off the rules in the inherited ordering.

Moving to operation 450, changed rules are automatically propagated to the lower levels. The rules may be automatically propagated based on different conditions. For example, a change to a rule may be automatically propagated in response to any change to the rule, at pre-determined times (e.g. check for rule changes every 5, 10, 30, 60 minutes, once a day, and the like), in response to a selection to activate the change, and the like.

Flowing to operation 460 an ordering of the rules for execution is determined. The execution of the rules may be configured differently depending on the system. For example, some services/programs may allow rules to be fired in parallel while other services/programs follow a specified order of execution. According to an embodiment, rules are fired according to hierarchical level (e.g. top level rules fired before lower level rules) and whether the rules are ordered (when ordered the rules are executed in arranged order).

Transitioning to operation 470, the rules are executed according to the determined order.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for defining rules associated with a multi-tenant service that provides resources to different tenants, comprising:
    displaying rules including determined rules from a determined hierarchical level and inherited rules from hierarchical levels above the determined hierarchical level to form displayed rules, wherein any rules created at a hierarchical level above the determined hierarchical level are automatically inherited by lower hierarchical levels;
    distinguishing the inherited rules from the determined rules, wherein distinguishing the inherited rules from the determined rules includes displaying an indicator that indicates a source of an inherited rule from a hierarchical level above the determined hierarchical level;
    receiving a change to the displayed rules;
    determining that the determined hierarchical level is above a lowest hierarchical level; and
    in response to determining that the determined hierarchical level is above the lowest hierarchical level, automatically providing the change to each lower hierarchical level such that the determined rules are displayed at each of the lower hierarchical levels and include the change made to the displayed rules.

2. The method of claim 1, wherein receiving the change to the displayed rules comprises determining when a rule is enabled and when the rule is disabled, wherein the inherited rules can be enabled and disabled at each of the hierarchical levels.

3. The method of claim 1, wherein receiving the change to the displayed rules comprises determining when a rule is added.

4. The method of claim 1, wherein receiving the change to the displayed rules comprises determining an ordering of the displayed rules.

5. The method of claim 1, wherein receiving the change to the displayed rules comprises determining when an inherited rule is copied and creating a local version of the inherited rule that is editable and can be deleted.

6. The method of claim 1, wherein the indicator is a name near a display of at least one inherited rule.

7. The method of claim 1, further comprising:
    displaying ordered inherited rules as a grouping; and
    indicating a name near a display of the ordered inherited rules that indicates a level where the ordering was created.

8. The method of claim 1, further comprising preventing an ordering of inherited rules from being changed at a lower hierarchical level but allowing each of the inherited rules within the ordering to be enabled or disabled.

9. The method of claim 1, further comprising executing the displayed rules based on an ordering of the displayed rules determined from the hierarchical levels of the displayed rules and any explicit ordering of the displayed rules.

10. A computer storage device having computer-executable instructions for defining rules associated with a multi-tenant service that provides resources to different tenants, comprising:
    displaying the rules including current rules from a current hierarchical level and inherited rules from hierarchical levels above the current hierarchical level to form displayed rules, wherein any rules created at a hierarchical level above the current hierarchical level are automatically inherited by lower hierarchical levels in a same branch of hierarchy;
    distinguishing the inherited rules from the current rules within a display, wherein distinguishing the inherited rules from the current rules includes displaying an indicator that indicates a source of an inherited rule from a hierarchical level above the current hierarchical level;
    receiving a change to the displayed rules;
    determining that the current hierarchical level is above a lowest hierarchical level; and
    in response to determining that the current hierarchical level is above the lowest hierarchical level, automatically providing the change to each lower hierarchical level such that the inherited rules are displayed at each of the lower hierarchical levels and include the change made to the displayed.

11. The computer storage device of claim 10, wherein receiving the change to the displayed rules comprises determining when a rule is added.

12. The computer storage device of claim 10, wherein receiving the change to the displayed rules comprises receiving a specific ordering of a subset of the displayed rules.

13. The computer storage device of claim 10, wherein receiving the change to the displayed rules comprises creating a local version of an inherited rule that is editable and can be deleted at the current hierarchical level.

14. The computer storage device of claim 10, wherein distinguishing the inherited rules comprises displaying ordered rules as a grouping and indicating a name near a display of the ordered rules that indicates a level where the ordering was created.

15. The computer storage device of claim 10, further comprising preventing an ordering of the inherited rules from being changed at a lower hierarchical level but allowing each of the inherited rules within the ordering to be enabled or disabled.

16. A system for defining rules associated with a multi-tenant service that provides resources to different tenants, comprising:
    a network connection that is coupled to tenants of a multi-tenant service;
    a processor and a computer-readable medium;
    an operating environment stored on the computer-readable medium and executing on the processor; and a rules manager operating under a control of the operating environment and operative to:
   distinguish inherited rules from a current hierarchical level within a display, wherein distinguishing the inherited rules from the current hierarchical level includes displaying an indicator that indicates a source of an inherited rule from a hierarchical level above a determined hierarchical level,
   wherein the rules include current rules from the current hierarchical level and the inherited rules from hierarchical levels above the current hierarchical level to form displayed rules, and wherein any rules created at a hierarchical level above the current hierarchical level are automatically inherited by lower hierarchical levels in a same branch of hierarchy;
   receive a change to the displayed rules;
   determine that the current hierarchical level is above a lowest hierarchical level to form a determination; and
   in response to the determination, automatically provide the change to each lower hierarchical level such that when the inherited rules are displayed at each of the lower hierarchical levels and include the change made to the displayed rules.

17. The system of claim 16, wherein the operating environment is operative to at least one of:
   determine when a rule is added;
   receive a specific ordering of a subset of the displayed rules; or
   create a local version of an inherited rule that is editable and can be deleted at the current hierarchical level.

18. The system of claim 16, wherein the operating environment is further operative to:
   display ordered inherited rules as a grouping; and
   indicate a name near a display of the ordered inherited rules that indicates a level where the ordering was created.

19. The system of claim 16, wherein the operating environment is further operative to:
   prevent an ordering of inherited rules from being changed at a lower hierarchical level but allow each of the inherited rules within the ordering to be enabled or disabled.

* * * * *